United States Patent [19]
Iijima

[11] Patent Number: 4,701,110
[45] Date of Patent: Oct. 20, 1987

[54] SWASH-PLATE TYPE ROTARY COMPRESSOR WITH DRIVE SHAFT, LUBRICATION

[75] Inventor: Takeo Iijima, Saitama, Japan

[73] Assignee: Diesel Kiki Co., Ltd., Tokyo, Japan

[21] Appl. No.: 865,079

[22] Filed: May 19, 1986

[30] Foreign Application Priority Data

May 20, 1985 [JP] Japan ............................ 60-107137

[51] Int. Cl.[4] .......................... F04B 1/16; F16J 10/02; F01M 1/06

[52] U.S. Cl. ............................ 417/269; 417/DIG. 1; 92/71; 92/169; 92/223; 184/6.17

[58] Field of Search ............ 417/269, DIG. 1; 92/71, 92/169, 223; 184/6.17

[56] References Cited

U.S. PATENT DOCUMENTS

| | | | |
|---|---|---|---|
| 1,426,138 | 8/1922 | Allyne | 92/223 |
| 2,570,698 | 10/1951 | Manseau | 417/269 |
| 3,754,842 | 8/1973 | Schlanzky | 417/269 |
| 3,888,604 | 6/1975 | Oshima et al. | 417/269 |
| 4,079,720 | 3/1978 | Takahashi | 92/169 X |
| 4,273,518 | 6/1981 | Shibuya | 417/269 |
| 4,360,321 | 11/1982 | Copp, Jr. et al. | 417/269 |
| 4,544,331 | 10/1985 | Shibuya | 417/269 |

FOREIGN PATENT DOCUMENTS

| | | | |
|---|---|---|---|
| 823934 | 10/1937 | France | 184/6.17 |
| 104014 | 8/1979 | Japan | 417/269 |
| 217783 | 12/1983 | Japan | 417/269 |

*Primary Examiner*—Carlton R. Croyle
*Assistant Examiner*—Paul F. Neils
*Attorney, Agent, or Firm*—Frishauf, Holtz, Goodman & Woodward

[57] ABSTRACT

In a swash-plate type rotary compression, a pair of cylinder blocks are formed of an aluminum alloy containing 16 to 20 weight % silicon. A ring made of a synthetic resin having wear resistance and slidability is fitted in a ring groove formed in a sliding surface of each of pistons which is brought into sliding contact with the corresponding cylinder bore, or a coating layer formed of a ferrous metal is provided on the above sliding surface. A drive shaft is fitted in a central bore in each of the cylinder blocks such that radial load exerted by the drive shaft is directly borne by an inner peripheral surface of the central bore, and an oil passageway supplies lubricating oil to a clearance between an outer peripheral surface of the drive shaft and the inner peripheral surface of the central bore.

6 Claims, 10 Drawing Figures

SWASH-PLATE TYPE ROTARY COMPRESSOR WITH DRIVE SHAFT, LUBRICATION

BACKGROUND OF THE INVENTION

The present invention relates to a swash-plate type rotary compressor such as a refrigerant compressor for use in an air conditioning system for vehicles.

FIG. 1 shows a conventional swash-plate type rotary compressor which comprises a housing 1, a drive shaft 2 rotatably mounted in the housing 1, and a pair of cylinder blocks 3 disposed within the housing 1. Each of the cylinder blocks 3 has formed therein a plurality of cylinder bores 3*a* which have their respective axes extending substantially parallel to the axis of the drive shaft 2 and which are disposed around the drive shaft 2 in circumferentially spaced relation to each other. A piston 4 is slidably fitted in each of the cylinder bores 3*a* for reciprocating motion therein. A swash plate 6 is mounted on the drive shaft 2 for rotation therewith in such a manner that a central bore 5*a* in a hub 5 of the swash plate 6 is fitted on the drive shaft 2. The swash plate 6 is engaged by the pistons 4. A thrust bearing 9 is disposed between an annular bearing surface 7 projecting from each end face of the hub 5 of the swash plate 6 and an end face of a hub 8 of each of the cylinder blocks 3. During rotation of the swash plate 6, the pistons 4 are reciprocated within the cylinder bores 3*a* to draw fluid and compress same.

In the conventional swash-plate type rotary compressor constructed as above, the cylinder blocks 3 are formed of aluminum alloy containing 12 weight % silicon, which has insufficient wear resistance. Accordingly, an iron liner 10 is cast on a sliding surface of each of the cylinder bores 3*a*, with which the corresponding piston 4 is brought into sliding contact, an aluminium alloy containing 16 weight % silicon is cast at two locations on an outer peripheral surface of the drive shaft 2 to form radial bearings 11, and bushes 12 are respectively fitted on the outer peripheral surface of the drive shaft 2 at each location between each radial bearing 11 and the corresponding thrust bearing 9, to thereby improve the wear resistance of the sliding portions of the cylinder blocks 3.

The arrangement in which a separate component part is provided on each sliding portion on the cylinder blocks 3 to improve the wear resistance has such disadvantages that the number of component items is large, the manufacturing steps are complicated, and the mass-productivity is low.

OBJECT AND SUMMARY OF THE INVENTION

It is the object of the invention is to provide a swash-plate type rotary compressor in which each sliding portion on cylinder blocks has improved resistance without particular provision of separate component parts as employed in the conventional arrangement, to thereby reduce the number of component items, simplify the manufacturing steps, decrease the overall weight, and reduce the manufacturing cost.

According to the invention, there is provided a swash-plate type rotary compressor which is arranged such that cylinder blocks are formed of an aluminum containing 16 to 20 weight % silicon. Preferably, an annular groove is provided in a sliding surface of each of pistons, which is brought into sliding contact with a corresponding cylinder bore, and a ring formed of a synthetic resin having sufficient wear resistance and sufficient lubricity is fitted in the annular groove, so that the piston slides in the corresponding cylinder bore through the ring.

Alternatively, a coating layer formed of a ferrous metal is provided on a sliding surface of each of the pistons, which is brought into sliding contact with a corresponding cylinder bore.

Also preferably, the drive shaft is fitted in a central bore in a hub of each of the cylinder blocks in a manner such that radial load exerted by the drive shaft is directly borne by an inner peripheral surface of the central bore in the hub of each of the cylinder blocks, and an oil passageway is provided for supplying lubricating oil to a clearance between the inner peripheral surface of the central bore in the hub of each of the cylinder blocks and an outer peripheral surface of the drive shaft.

The oil passageway may extend to a sliding portion of a coresponding thrust bearing disposed between a first annular bearing surface projecting intergrally from each of the end faces of the hub of the swash plate and an end face of the hub of the corresponding cylinder blocks, to supply lubricating oil to the thrust bearing, and a second annular bearing surface projects integrally from an end face of the hub to each of the cylinder blocks, and supports the corresponding thrust bearing, such that thrust load is directly borne by the second annular bearing surfaces on the respective cylinder The above and other objects, features and advantages of the invention will be more apparent from the ensuing detailed description taken in conjunction with the accompanying drawings.

DETAILED DESCRIPTION

Embodiments of the present invention will be described in detail with reference to the drawings.

Figure 1:
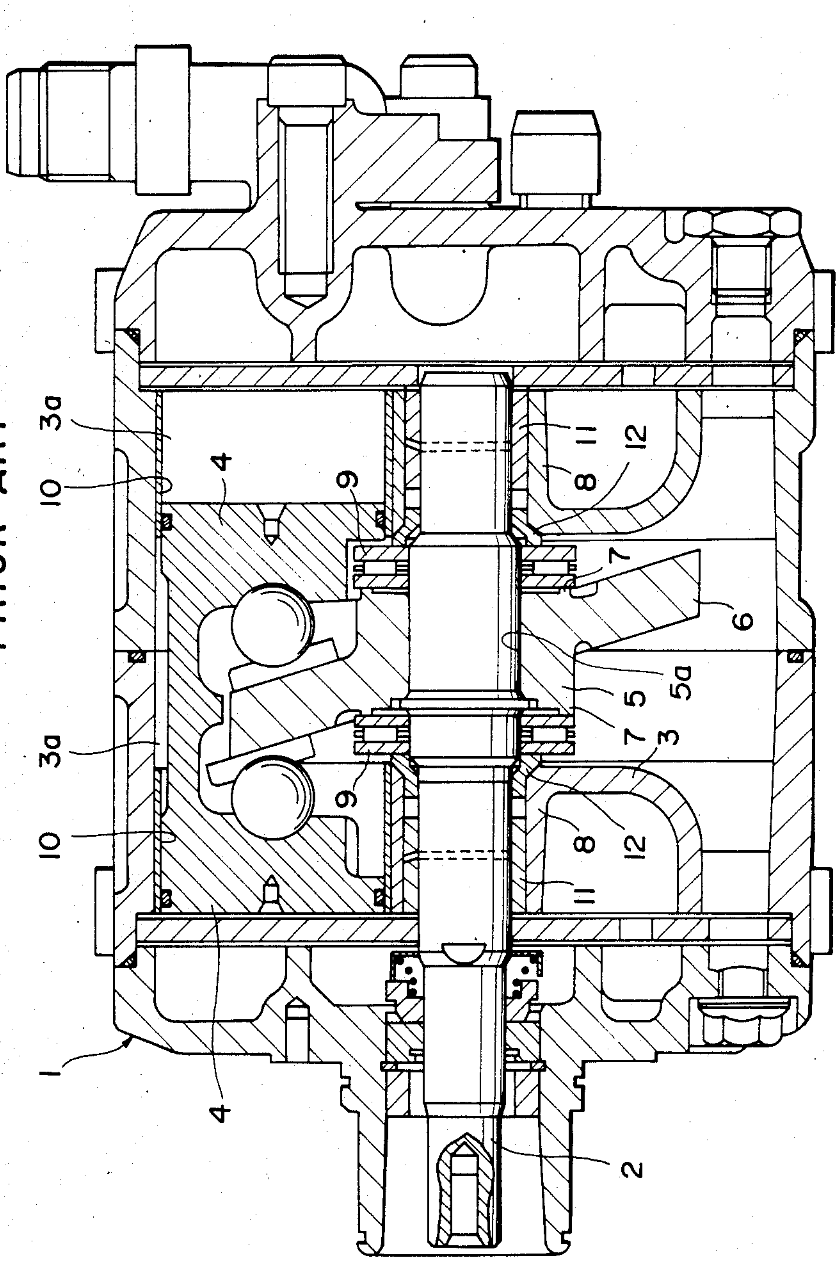
FIG. 1 PRIOR ART
FIG. 1 is a longitudinal cross-sectional view showing a conventional swash-plate type rotary compressor.
Figure 2:
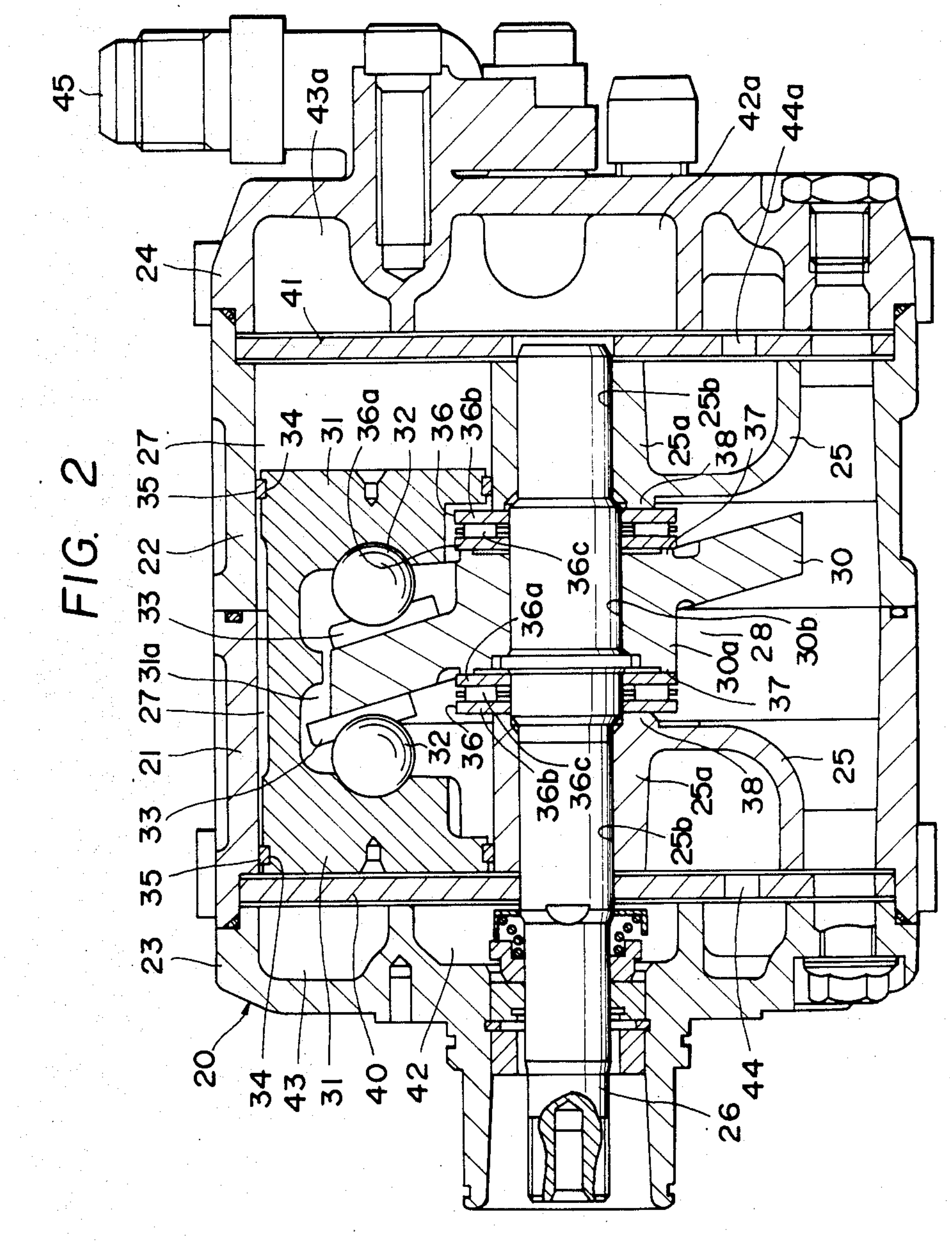
FIG. 2 is a longitudinal cross-sectional view showing a swash-plate type rotary compressor in accordance with a first embodiment of the present invention.
Figure 3:
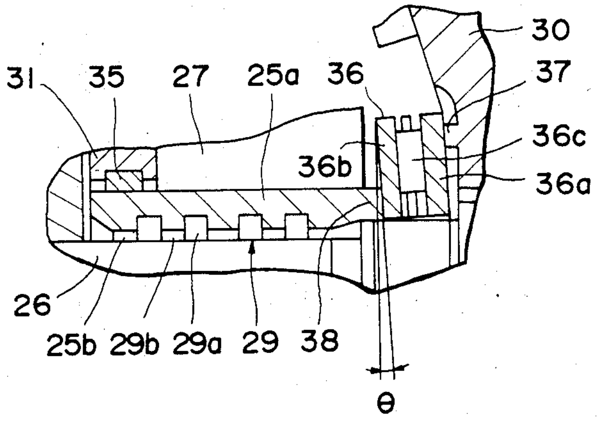
FIG. 3 is a fragmentary enlarged, cross-sectional view showing a fitting portion of a drive shaft and a central bore in a hub of each of the cylinder blocks illustrated in FIG. 2.

FIG. 2 shows a swash-plate type rotary compressor in accordance with a first embodiment of the present invention. The rotary compressor comprises a housing 20 which includes a pair of cylindrical casing members 21 and 22 which are substantially symmetrical in configuration to each other and are joined to each other in an abutting and aligned manner, and front and rear heads 23 and 24 mounted respectively on open opposite ends of the respective casing members 21 and 22. A cylinder block 25 integrally formed within each of the casing members 21 and 22 is formed of an aluminum alloy containing 16 to 20 weight % silicon. A plurality of cylinder bores 27 are formed in each of the cylinder blocks 25 in such a manner that the cylinder bores 27 have their respective axes extending parallel to the axis of a drive shaft 26 and are arranged in circumferentially spaced relation to each other. A swash plate chamber 28 is defined by the cylinder blocks 25 at an axially intermediate location therebetween. The drive shaft 26 axially extends substantially along the central axis of the housing 20. An axial portion of the drive shaft 26 which is closer toward one end of the drive shaft 26 with respect to a substantially axially central portion thereof is rotatably fitted in and supported by a central bore **25*b* in a hub 25*a* of the cylinder block within one of the casing members 21. The other axial end portion of the drive shaft 26 is rotatably fitted in and supported by a central bore 25*b* in a hub 25*a* of the cylinder block 25 within the other casing member 22. Accordingly, the radial load exerted by the drive shaft 26 is directly borne or supported by an inner peripheral surface of the central bore 25*b* in the hub 25*a* of each of the cylinder blocks 25. As shown in FIG. 3, an oil passageway 29 is formed in the inner peripheral surface of the central bore 25*b* in the hub 25*a* of each of the cylinder blocks 25, for supplying lubricating oil to a location supporting the radial load, i.e., a clearance between the inner peripheral surface of the central bore 25*b* and an outer peripheral surface of the drive shaft 26. The oil passageway 29 is comprised of a plurality of annular grooves 29*a* circumferentially formed in the inner peripheral surface of the central bore 25*b* in a fashion spaced from each other axially of the central bore 25*b* in the hub 25*a*, and an axial straight groove 29*b* axially formed in the inner peripheral surface of the central bore 25*b*. The axial straight groove 29*b* has one end thereof opening into the end face of the hub 25*a* and axially extends through the annular grooves 29*a*** to axially communicate with each other.

Figure 4:
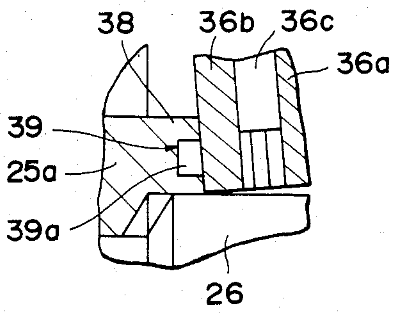
FIG. 4 is a fragmentary enlarged, cross-sectional view showing an annular bearing surface on an end face of the hub of each of the cylinder blocks and a corresponding thrust bearing.
Figure 5:
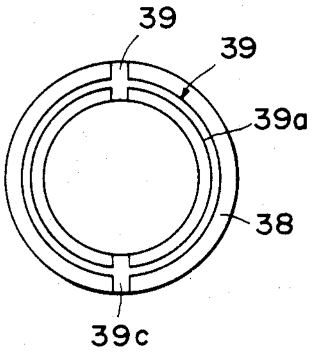
FIG. 5 is a front elevational view showing the annular bearing surface on the end face of the hub of each of the cylinder blocks illustrated in FIG. 4.

A swash plate 30 is rotatably disposed within the swash plate chamber 28 and is mounted on the drive shaft 26 for rotation therewith in such a manner that a central bore **30*b* in a hub 30*a* of the swash plate 30 is fitted on the outer peripheral surface of a substantially axially central portion of the drive shaft 26. Each of double headed pistons 31 has formed therein a central recess 31*a* having front and rear surfaces slidably engaged respectively by front and rear surfaces of the swash plate 30 through balls 32 and shoes 33. Each of the pistons 31 is slidably fitted in the corresponding cylinder bore 27 for reciprocating motion therein during rotation of the swash plate 30. An annular groove 34 is circumferentially formed in a sliding portion of an outer peripheral surface of each of the pistons 31, which is brought into sliding contact with the corresponding cylinder bore 27. The piston 31 slides in the cylinder bore 27 through a sliding ring 35 which is fitted in the annular groove 34 and is formed of a synthetic resin having high wear resistance and high lubricity such as, polytetrafluoroethylene resin. A thrust bearing 36 is disposed between the end face of the hub 25*a* of each of the cylinder blocks 25 and the corresponding end face of the hub 30*b* of the swash plate 30. Each of the thrust bearings 36 comprises a pair of inner and outer rings 36*a* and 36*b* and needles 36*c* disposed therebetween. An outer peripheral portion of the inner ring 36*a* abuts against an annular bearing surface 37 projecting integrally from the corresponding end face of the hub 30*a* of the swash plate 30, and an inner peripheral portion of the outer ring 36*b* abuts against an annular bearing surface 38 projecting integrally from the end face of the hub 25*a* of the corresponding cylinder block 25. The annular bearing surfaces 37 and 38 are inclined at an annular corresponding to an angle of inclination $\theta$ of the thrust bearing 36 assumed when a preload is applied to the bearing 36. The inclinations are depicted in FIGS. 3 and 4 in somewhat accentuated manner. As shown in FIGS. 4 and 5, a lubricating oil groove 39 is provided in the bearing surface 38 on the end face of the hub 25*a* of each of the cylinder blocks 25. The lubricating oil groove 39 is comprised of an annular groove 39*a* and radial straight grooves 39*b* and 39*c* which intersect with the annular groove 39*a* and open into inner and outer peripheries of the bearing surface 38. Valve plates 40 and 41 are disposed respectively between the casing member 21 and the front head 23 and between the casing member 22 and the rear head 24. A suction chamber 42 and a discharge chamber 43 are defined between the front head 23 and the valve plate 40, with the suction chamber 42 being radially inwardly located adjacent the drive shaft 26 and with the discharge chamber 43 being radially outwardly located around the suction chamber 42. Similarly, a suction chamber 42*a* and a discharge chamber 43*a* are defined between the rear head 24 and the valve plate 41, with the suction chamber 42*a* being radially inwardly located adjacent the drive shaft 26 and with the discharge chamber 43*a* being radialy outwardly located around the suction chamber 42*a*. Each of the suction chambers 42 and 42*a* can communicate with a corresponding one of the cylinder bores 27 through a suction opening (not shown) in the valve plate 40, 41 and a suction valve (not shown) corresponding to the cylinder bore 27. Each of the discharge chambers 43 and 43*a* can communicate with a corresponding one of the cylinder bores 27 through a discharge opening 44, 44*a* in the valve plate 40, 41 and a discharge valve (not shown) corresponding to the cylinder bore 27**.

The operation of the swash-plate type rotary compressor constructed as above in accordance with the first embodiment of the invention will now be described. When the swash plate 30 is rotated together with the drive shaft 26, the pistons 31 engaging with the swash plate 30 are reciprocated in their respective cylinder bores 27. When each of the pistons 31 on the front side is moving through a suction stroke, fluid flows into the suction chamber 42 on the front side successively through a suction port 45, the suction chamber **42*a* on the rear side, and a suction passageway (not shown), and is drawn into the corresponding cylinder bore 27 on the front side through the suction valve (not shown). When the piston 31 on the front side is subsequently moving through a compression stroke, the drawn fluid is compressed, and the compressed fluid enters the discharge chamber 43 on the front side through the discharge valve (not shown) on the front side, and is discharged successively through a discharge passageway (not shown), the discharge chamber 43*a* on the rear side, and a discharge port 45. The piston 31 on the rear side performs strokes in a manner alternately with those preformed by the piston 31 on the front side. In the operation described above, if the fluid to be compressed is a refrigerant gas for circulation in an air conditioning system, lubricating oil is contained in the refrigerant gas and is separated therefrom to be stored in an oil sump at the bottom of the swash plate chamber 28. A lower portion of the swash plate 30 is dipped in the lubricationg oil in the oil sump, and the lubricating oil is splashed upward by the rotation of the swash plate 30 to lubricate the swash plate 30, the pistons 31, the drive shaft 26 and other various sliding portions. Particularly, the sliding portions (which support the radial load) of the inner peripheral surface of the hub 25***a* of each of the cylinder blocks 25 and the outer peripheral surface of the drive shaft 26, and the sliding portions (which support the thrust load) of each thrust bearing 36 and the bearing surface 38 of the hub 25*a* of the corresponding cylinder block 25 are effectively lubricated by lubricating oil splashed up and stored in the oil passageway 29 and the lubricating oil groove 39.

Since in the above described first embodiment the cylinder blocks 25 are formed of the aluminium alloy containing 16 to 20 weight % silicon, the cylinder blocks 25 have improved wear resistance, thereby dispensing with the use of the conventional iron liners, radial bearings made of the aluminium alloy containing 16 weight % silicon, bushes or the like, which results in that the number of component items is decreased and the manufacturing steps are simplified, making it possible to reduce the overall weight of the compressor and to reduce the manufacturing cost. Further, since the radial load of the drive shaft is directly borne by the inner peripheral surface of the central bore in the hub of each of the cylinder blocks, and the oil passageway is provided for supplying lubricating oil to the clearance between the inner peripheral surface of the central bore in the hub of each of the cylinder blocks and the outer peripheral surface of the drive shaft, it is possible to omit the conventional radial bearings disposed between the outer peripheral surface of the drive shaft and the inner peripheral surfaces of the respective hubs of the cylinder blocks, thereby further reducing the number of component items, simplifying the manufacturing steps, reducing the overall weight of the compressor as well as the manufacturing cost, and enabling to effectively lubricate each sliding portion of the cylinder blocks and the drive shaft supporting the radial load, by means of the oil passageways, even without the use of radial bearings. Furthermore, since the annular bearing surface integrally projects from the end face of the hub of each of the cylinder blocks, for supporting the corresponding thrust bearing, so that the thrust load is directly borne by the bearings surfaces on the respective cylinder blocks, in addition to the above described advantages the conventional bushes provided for supporting their respective thrust bearings are no longer necessary, further reducing the number of component items and further simplifying the manufacturing steps, making it possible to further reduce the overall weight of the compressor and to further reduce the manufacturing cost. In addition, since the sliding ring 35 formed of the synthetic resin having high wear resistance and high lubricity is fitted in the annular groove 34 in the sliding portion of each of the pistons 31, which is brought into sliding contact with the corresponding cylinder bore 27, the piston 31 can smoothly slide within the cylinder bore 27 while always maintaining contact between the corresponding cylinder bore 27 and itself. Furthermore, since each bearing surface 37 of the hub 30*a* of the swash plate 30 and the bearing surface 38 of the hub 25*a* of each of the cylinder blocks 25 are inclined at an angle corresponding to the angle of inclination of the corresponding thrust bearing 36 assumed when the preload is applied to the thrust bearing, the bearing surfaces 37 and 38 are brought into close contact with the thrust bearing 36 without any gap therebetween. Thus, the contact surface pressure is uniformly distributed over the whole surface area of the bearing surface 37, 38, making it possible to decrease the amount of partial abrasion of the thrust bearing 36.

Figure 6:
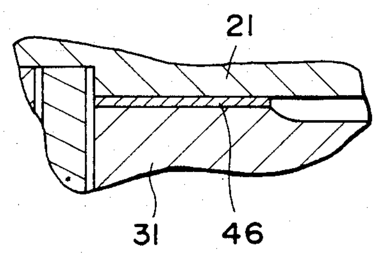
FIG. 6 is a fragmentary enlarged, cross-sectional view showing a lining layer on each of pistons of a swash-plate type rotary compressor in accordance with a second embodiment of the present invention.

FIG. 6 shows a second embodiment of the invention. In FIG. 6, like reference numerals are used to designate like parts or components shown in FIGS. 2 through 5, and the description of such like parts or components is therefore omitted. The second embodiment is arranged such that a coating layer 46 formed of a ferrous metal is provided on the sliding outer peripheral surface of each of the pistons 31, which is brought into sliding contact with the corresponding cylinder bore 27, so that the piston 31 slides in the cylinder bore 27 through the coating layer 46. The coating layer 46 may be formed on the pistons 31 in such a manner that a powdered coating material formed of a ferrous metal such as iron is melted by a flame formed by combustion of oxygen and acetylene (or hydrogen) and is injected at the sliding surface of the piston 31 through a spray nozzle to form the coating layer 46 on the same sliding surface which is brought into sliding contact with the cylinder bore 27.

With the arrangement of the second embodiment, the conventional iron liner cast on the sliding surface of each of the cylinder bores with which the corresponding piston is brought into sliding contact can be omitted, making it possible to reduce the overall weight of the compressor and to reduce the manufacturing cost. Further, the coating layer enables the piston to smoothly slide in the corresponding cylinder bore and reduces the wear resistance of the sliding surface of the piston.

Figure 7:
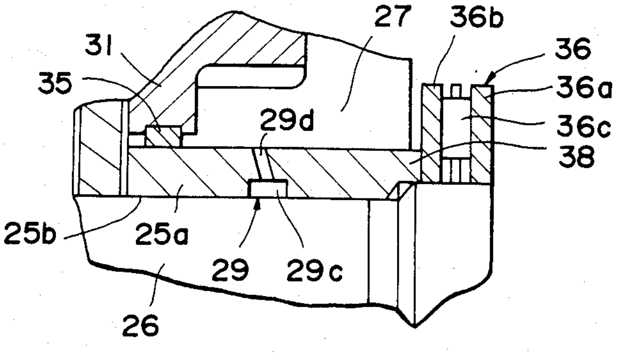
FIG. 7 is a view similar to FIG. 3, but showing a third embodiment of the present invention.

FIG. 7, shows a third embodiment of the invention. In FIG. 7, like reference numerals are used to designate like parts or components shown in FIGS. 2 through 5, and the description of such like parts or components are therefore omitted. The third embodiment is arranged such that the oil passageway 29 for supplying lubricating oil to the clearance between the inner peripheral surface of the hub 25*a* of each of the cylinder blocks 25 and the outer peripheral surface of the drive shaft 26 is comprised of an annular groove 29*c* circumferentially formed in the inner peripheral surface of the hub 25*a* and a radial slot 29*d* formed in the hub 25*a* and communicating the annular groove 29*c* with the cylinder bore 27. Blowby gas, which is produced during the compression stroke of the piston 31, is guided through the radial slot 29*d* into the annular groove 29*c* to perform lubrication by the lubricating oil contained in the refrigerant gas.

Figure 8:
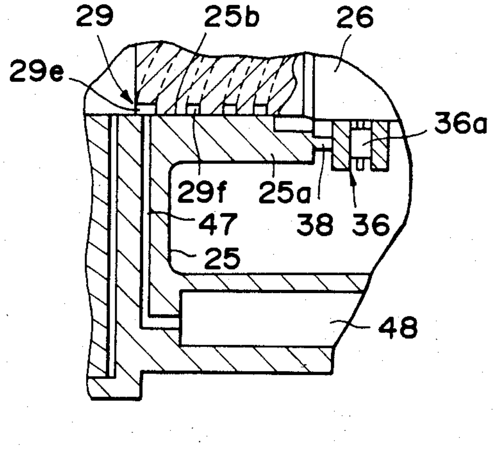
FIG. 8 is a view similar to FIG. 3, but showing a fourth embodiment of the present invention.

FIG. 8 shows a fourth embodiment of the invention. In FIG. 8, like reference numerals are used to designate like parts or components shown in FIGS. 2 through 5, and the description of such like parts or components is therefore omitted. The fourth embodiment is arranged such that the oil passageway 29 for supplying lubricating oil to the clearance between the inner peripheral surface of the hub 25*a* of each of the cylinder blocks 25 and the outer peripheral surface of the drive shaft 26 as well as to the corresponding thrust bearing 36 is comprised of an annular groove 29*e* formed in the outer peripheral surface of the drive shaft 26 and extending circumferentially thereof, and a helical groove 29*f* formed in the outer peripheral surface of the drive shaft 26 in communication with the annular groove 29*e* and helically extending in the direction (counterclockwise) opposite to the rotating direction of the drive shaft 26. The annular groove 29*e* is in communication with an oil sump 48 through a communication passage 47 provided in the cylinder block 25. As the drive shaft 26 is rotated, lubricating oil in the oil sump 48 flows into the communication passage 47, the annular groove 29*e* and the helical groove 29*f* in the order mentioned, and the lubricating oil is successively fed axially of the drive shaft 26 due to the action of the helical groove 29*f* and is ultimately fed to the bearing surface 38 on the hub 25*a* of the cylinder block 25 and to the sliding portions of the thrust bearing 36. The lubricating oil is then directed to the needles 36*c* of the thrust bearing 36 due to the centrifugal force caused by rotation of the needles 36*a*, whereby the lubrication of the thrust bearing 36 takes place effectively.

Figure 9:
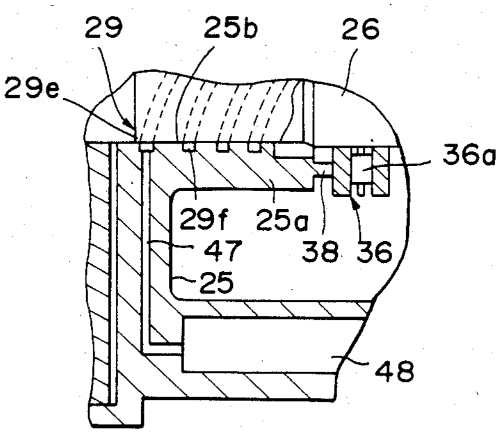
FIG. 9 is a view similar to FIG. 3, but showing a fifth embodiment of the present invention.

Incidentally, as shown in FIG. 9, the annular groove 29*e* and the helical groove 29*f* may be provided in the inner peripheral surface of the hub 25*a* of each of the cylinder blocks 25 to obtain substantially the same results as mentioned above.

Figure 10:
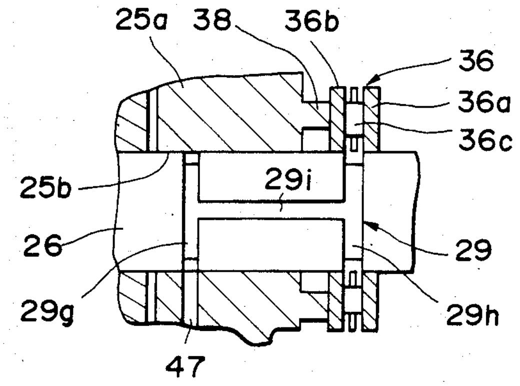
FIG. 10 is a view similar to FIG. 3, but showing a sixth embodiment of the present invention.

FIG. 10 shows a sixth embodiment of the invention. In FIG. 10, like reference numerals are used to designate like parts or components shown in FIGS. 2 through 5, and the description of such like parts or components is therefore omitted. The fifth embodiment is arranged such that the oil passageway 29 for supplying lubricating oil to the clearance between the inner peripheral surface of the hub 25*a* of each of the cylinder blocks 25 and the outer peripheral surface of the drive shaft 26 and to the corresponding thrust bearing 36 is comprised of a first annular groove 29*g* formed in a portion of the outer peripheral surface of the drive shaft 26 which is axially spaced from the thrust bearing 36 away from the swash plate 30, a second annular groove 29*h* formed in a portion of the outer peripheral surface of the drive shaft 26 which is located opposite the needles 36*c*, i.e., a sliding portion of the thrust bearing 36, and a straight groove 29*i* formed in the outer peripheral surface of the drive shaft 26 in a manner extending axially thereof to communicate the first and second annular grooves 29*g* and 29*h* with each other. The first annular groove 29*g* is in communication with an oil sump (not shown) through a communication passage 47, similarly to the embodiment shown in FIG. 8. The inertia of the centrifugal force produced in the rotating needles 36*c* causes the lubricating oil to be drawn up from the oil sump and fed to the sliding portion of the thrust bearing 36 through the passage 47, and the grooves 29*g*, 29*i*, 29*h*, to thereby perform the lubrication.

What is claimed is:

1. A swash-plate type rotary compressor comprising:
a housing;
a drive shaft rotatably mounted in said housing;
cylinder blocks disposed within said housing, each of said cylinder blocks having formed therein a plurality of cylinder bores arranged around an axis of said drive shaft in circumferentially spaced relation to each other and having respective axes extending substantially parallel to the axis of said drive shaft;
a plurality of pistons fitted respectively in said cylinder bores for reciprocating motion therein;
a swash plate including a first hub having end faces and a first central bore, the swash plate being mounted on said drive shaft for rotation therewith so that said first central bore in said first hub is fitted on said drive shaft, said swash plate being engaged by said pistons;
wherein rotation of said swash plate causes said pistons to be reciprocated in said cylinder bores to draw fluid and compress same;
said cylinder blocks being formed of an aluminum alloy containing 16 to 20 weight % of silicon;
wherein each of said cylinder blocks includes a second hub having a second central bore;
said drive shaft being fitted within the second central bore in the second hub of each of said cylinder blocks so that a radial load exerted by said drive shaft is directly borne by an inner peripheral surface of said second central bore in the second hub of each of said cylinder blocks,
the compressor including an oil passageway for supplying lubricating oil to a clearance between an outer peripheral surface of said drive shaft and the inner peripheral surface of said second central bore in the second hub of each of said cylinder blocks; and
wherein said oil passageway comprises a plurality of annular grooves formed in the inner peripheral surface of said second central bore in said second hub of each of said cylinder blocks, and spaced from each other axially of said drive shaft, and an axial groove extending axially of said drive shaft and through said annular grooves to communicate said annular grooves with each other, said axial groove having one end opening into an end face of the second hub of the corresponding cylinder block.

2. A swash-plate type rotary compressor, comprising:
a housing;
a drive shaft rotatably mounted in said housing;
cylinder blocks disposed within said housing, each of said cylinder blocks having a plurality of cylinder bores arranged around an axis of said drive shaft in circumferentially spaced relation to one another and having respective axes extending substantially parallel to the axis of said drive shaft;
a plurality of pistons fitted respectively in said cylinder bores for reciprocating motion therein;
a swash plate including a first hub having end faces and a first central bore, the swash plate being mounted on said drive shaft for rotation therewith so that first central bore in said first hub is fitted on said drive shaft, said swash plate being engaged by said pistons;
wherein rotation of said swash plate causes said pistons to be reciprocated in said cylinder bores to draw fluid and compress same;
said cylinder blocks being formed of an aluminum alloy containing 16 to 20 weight % of silicon;
a first annular bearing surface projecting integrally from each of the end faces of said hub of said swash plate;
each of said cylinder blocks including a second hub having a second central bore;

a pair of thrust bearings each disposed between a corresponding first annular bearing surface and an end face of the second hub of a corresponding cylinder block;

said drive shaft being fitted within the second central bore in the seocnd hub of each of said cylinder blocks so that a radial load exerted by said drive shaft is directly borne by the inner peripheral surface of said second central bore in the second hub of each of said cylinder blocks;

the compressor including an oil passageway for supplying lubricating oil to a clearance between the inner peripheral surface of said second central bore in said second hub of each of said cylinder blocks and the outer peripheral surface of said drive shaft, and to a sliding portion of a corresponding thrust bearing;

a second annular bearing surface projecting integrally from the end face of said second hub of each of said cylinder blocks, for supporting a corresponding thrust bearing such that thrust load exerted by said drive shaft is directly borne by the second annular bearing surfaces of the cylinder blocks; and wherein said oil passageway comprises an annular groove formed in the outer peripheral surface of said drive shaft and extending circumferentially thereof and a helical groove formed in the outer peripheral surface of said drive shaft in communication with said annular groove and helically extending in a direction opposite to the rotating direction of said drive shaft.

3. A swash-plate type rotary compressor, comprising:

a housing;

a drive shaft rotatably mounted in said housing;

cylinder blocks disposed within said housing, each of said cylinder blocks having formed therein a plurality of cylinder bores arranged around an axis of said drive shaft in circumferentially spaced relation to each other and having respective axes extending substantially parallel to the axis of said drive shaft;

a plurality of pistons fitted respectively in said cylinder bores for reciprocating motion therein;

a swash plate including a first hub having end faces and a first central bore, the swash plate being mounted on said drive shaft for rotation therewith so that said first central bore in said first hub is fitted on said drive shaft, said swash plate being engaged by said pistons;

wherein rotation of said swash plate causes said pistons to be reciprocated in said cylinder bores to draw fluid and compress same;

said cylinder blocks being formed of an aluminum alloy containing 16 to 20 weight % of silicon;

a first annular bearing surface projecting integrally from each of the end faces of aid hub of said swash plate;

each of said cylinder blocks including a second hub having a second central bore;

a pair of thrust bearings each disposed between a corresponding first annular bearing surface and an end face of the second hub of a corresponding cylinder block;

said drive shaft being fitted within the second central bore in the second hub of each of said cylinder blocks so that a radial load exerted by said drive shaft is directly borne by the inner peripheral surface of said second central bore in the second hub of each of said cylinder blocks;

the compressor including an oil passageway for supplying lubricating oil to a clearance between the inner peripheral surface of said second central bore in said second hub of each of said cylinder blocks and the outer peripheral surface of said drive shaft, and to a sliding portion of a corresponding thrust bearing; and a second annular bearing surface projecting integrally from the end face of said second hub of each of said cylinder blocks. for supporting a corresponding thurst bearing such that thrust load exerted by said drive shaft is directly borne by the second annular bearing surfaces of the cylinder blocks;

wherein said oil passageway comprises a first annular groove formed in a portion of the outer peripheral surface of said drive shaft which is axially spaced from a corresponding thrust bearing away from said swash plate, a second annular groove formed in as portion of the outer peripheral surface of said drive shaft which is located opposite to the sliding portion of a corresponding thrust bearing, and a groove formed in the outer peripheral surface of said drive shaft and extending axially thereof to communicate said first and said second annular grooves with one another.

4. A swash-plate type rotary compressor as defined in claim 3, including a lubricating oil groove formed in the end face of said second hub of each of said cylinder blocks.

5. A swash-plate type rotary compressor as defined in claim 3, wherein said second annular bearing surface on the end face of said second hub of each of said cylinder blocks and said first annular bearing surface on the corresponding end face of said first hub of said swash plate are inclined at an angle corresponding to an angle of inclination of the corresponding thrust bearing assumed when a preload is applied to said thrust bearing.

6. A swash-plate type rotary compressor as defined in claim 5, including a lubricating oil groove formed in the end face of said second hub of each of said cylinder blocks.

* * * * *